United States Patent [19]
Iino

[11] Patent Number: 5,325,670
[45] Date of Patent: * Jul. 5, 1994

[54] CLUTCH CONTROL DEVICE FOR TRANSMISSION

[75] Inventor: Takashi Iino, Saitama, Japan

[73] Assignee: Honda Giken Kogyo Kabushiki Kaisha, Tokyo, Japan

[ * ] Notice: The portion of the term of this patent subsequent to Apr. 5, 2010 has been disclaimed.

[21] Appl. No.: 464,301

[22] Filed: Jan. 12, 1990

[30] Foreign Application Priority Data

Feb. 10, 1989 [JP] Japan ................................. 1-31718

[51] Int. Cl.$^5$ ................................. F16D 31/02
[52] U.S. Cl. ................................. 60/468; 60/489; 477/80
[58] Field of Search ................ 60/329, 468, 431, 487, 60/489; 91/452, DIG. 2; 192/0.076, 0.033

[56] References Cited

U.S. PATENT DOCUMENTS

| | | | |
|---|---|---|---|
| 3,139,723 | 7/1964 | Hollowell . | |
| 3,788,063 | 1/1974 | Kempson et al. | 60/431 |
| 3,986,357 | 10/1976 | Hoffman | 60/468 |
| 4,089,252 | 5/1978 | Patel et al. | 91/49 |
| 4,125,038 | 11/1978 | Hiramatsu | 74/869 |
| 4,560,043 | 12/1985 | Murasugi et al. | 192/0.076 |
| 4,591,038 | 5/1986 | Asagi et al. | 192/0.076 |
| 4,640,396 | 2/1987 | Nishimura | 192/0.076 |
| 4,730,522 | 3/1988 | Morimoto | 74/868 |
| 4,748,809 | 6/1988 | Sumiya et al. | 60/413 |
| 4,776,165 | 10/1988 | Iino | 60/468 |
| 4,850,192 | 7/1989 | Mitsumasa et al. | 60/468 |
| 4,901,529 | 2/1990 | Iino et al. | 60/489 |
| 4,939,900 | 7/1990 | Furumoto et al. | 60/456 |
| 4,958,492 | 9/1990 | Maki et al. | 60/468 |
| 4,958,494 | 9/1990 | Maki et al. | 60/468 |
| 4,970,862 | 11/1990 | Maki et al. | 60/468 |

FOREIGN PATENT DOCUMENTS

| | | |
|---|---|---|
| 0193412 | 9/1986 | European Pat. Off. . |
| 95722 | 8/1981 | Japan . |
| 61-207227 | 9/1986 | Japan . |
| 61-207228 | 9/1986 | Japan . |
| 207229 | 9/1986 | Japan . |
| 53343 | 3/1988 | Japan . |
| 53344 | 3/1988 | Japan . |
| 78936 | 3/1989 | Japan . |
| 1021723 | 3/1966 | United Kingdom . |

Primary Examiner—Edward K. Look
Assistant Examiner—F. Daniel Lopez
Attorney, Agent, or Firm—Lyon & Lyon

[57] ABSTRACT

A hydraulically operated continuously variable transmission associated with the engine of a motor vehicle has a clutch for controlling the transfer of power through the transmission and a hydraulic servo unit for selectively connecting and disconnecting the clutch. A clutch control device comprises a first discharge oil passage for discharging working oil from the hydraulic servo unit when the clutch is connected by the hydraulic servo unit to start the transfer of power, an orifice disposed in the first discharge oil passage and having a prescribed cross-sectional area, a second discharge oil passage for discharging the working oil from the first discharge oil passage, the second discharge oil passage communicating with the first discharge oil passage upstream of the orifice with respect to the direction in which the working oil flows through the first discharge oil passage, and a relief valve disposed in the second discharge oil passage and openable only when the pressure of the working oil in the second discharge passage is higher than the pressure of the working oil which is developed in the first discharge oil passage upstream of the orifice when the working oil is at a normal temperature. The degree to which the flow of the working oil is restricted by the orifice may be modified by an orifice charging valve depending on the magnitude of an indication of the throttle valve opening of the engine.

12 Claims, 7 Drawing Sheets

CLUTCH CONTROL DEVICE FOR TRANSMISSION

BACKGROUND OF THE INVENTION

The present invention relates to a clutch for controlling the transfer of power in a transmission, and more particularly to a device for controlling the operation of such a clutch.

Clutches for controlling the transfer of power in transmissions are classified into various types dependent on the transmissions with which the clutches are to be combined. For example, some clutches used in gear transmissions employ friction clutch plates, and those used in hydraulically operated transmissions comprise clutch valves for controlling the opening of a bypass passage.

One clutch device for use in a hydraulically operated continuously variable transmission is disclosed in Japanese Laid-Open Patent Publication No. 56-95722, for example. The disclosed clutch device includes a closed hydraulic circuit interconnecting a hydraulic pump and a hydraulic motor and composed of two hydraulic passages with a bypass passage extending therebetween, and a clutch valve disposed in the bypass for adjusting the opening of the bypass passage. The clutch valve is controlled in operation by a hydraulic actuator unit in the form of a cylinder. The hydraulic actuator unit is arranged to generate a control force commensurate with the rotational speed of an engine coupled to the transmission and acting in a direction to close the clutch valve (i.e., to connect the clutch), and a control force commensurate with the opening of the throttle valve and acting in a direction to open the clutch valve (i.e., to disconnect the clutch).

When the accelerator pedal of a motor vehicle with the transmission installed thereon is depressed to increase the throttle valve opening for setting the motor vehicle started, the rotational speed of the engine increases beyond a certain speed level, and the clutch valve is closed to connect the clutch. The motor vehicle is thus smoothly started.

If a hydraulic servo unit is employed to control the operation of the clutch valve to close the same, then it is necessary supply working oil of a certain hydraulic pressure to a cylinder chamber in the hydraulic servo unit for closing the clutch valve and also to drain working oil from an opposite cylinder chamber in the hydraulic servo unit.

If the working oil were discharged or drained without any restriction, then the clutch valve would be closed so quickly that the clutch would be connected abruptly, thereby producing a shock. It would be possible to provide an orifice in a drain passage for restricting the flow of the working oil discharge, so that the clutch valve would be closed at an appropriate speed by the hydraulic servo unit. With the orifice merely provided in the drain passage, however, since the rate at which the working oil flows through the orifice differs depending on the temperature of the working oil, the clutch would be connected slowly at a low oil temperature, and any desired clutch control would be impossible to carry out. Such a problem could be solved by varying the cross-sectional area of the orifice depending on the temperature of the working oil, but a complex mechanism would be needed to adjust the cross-sectional area of the orifice.

The same drawbacks would also be experienced with the controlling of a clutch having friction clutch plates with a hydraulic servo unit.

Adequate values required for the speed at which the clutch valve is closed vary from throttle valve opening to throttle valve opening. It is difficult to maintain the valve closing speed at an adequate level simply by providing the orifice in the drain passage.

Generally, when the throttle valve opening is small, i.e., if the clutch is to be connected while the accelerator pedal is not depressed substantially, it is required that the clutch valve be closed quickly to connect the clutch quickly. Conversely, when the throttle valve opening is large, the clutch has to be connected relatively slowly.

The above clutch valve control will be described in greater detail with reference to the continuously variable transmission disclosed in the publication referred to above. In the disclosed continuously variable transmission, after the clutch has been completely connected, a target engine rotational speed is established which corresponds to the throttle valve opening, and the transmission ratio or speed reduction ratio of the transmission is controlled so that the actual engine rotational speed will be brought into accord with the target speed. In order to effect a smooth transition from the connection of the clutch to the control of the speed reduction ratio, it is desirable so that the engine speed will not exceed the target speed when the clutch is connected, and the engine speed will smoothly be increased during the transition from the connection of the clutch to the control of the speed reduction ratio. If the clutch is connected when the accelerator pedal is not deeply depressed and hence the throttle valve opening is small, since the target engine rotational speed is low, the actual engine speed becomes higher than the target speed and then is lowered to the target speed after the clutch is connected, unless the clutch is connected quickly.

The clutch may be connected quickly by increasing the cross-sectional area of the orifice and closing the clutch valve quickly. By doing so, however, the clutch is connected too quickly when the accelerator pedal is depressed to a large degree and the throttle valve opening is large, and the engine speed is subjected to hunting.

SUMMARY OF THE INVENTION

In view of the aforesaid drawbacks of the conventional transmission clutch control arrangements, it is an object of the present invention to provide a clutch control device capable of controlling a clutch well without delaying the speed of clutch control operation even at low temperatures.

Another object of the present invention is to provide a clutch control device which can vary the clutch connecting speed so as to be close to a desired speed level depending on the opening of the throttle valve of an engine with which the clutch control device is combined.

According to the present invention, the above objects can be achieved by a clutch control device for a transmission having a clutch for controlling the transfer of power through the transmission and a hydraulic servo unit for selectively connecting and disconnecting the clutch, the clutch control device comprising a first discharge oil passage for discharging working oil from the hydraulic servo unit when the clutch is connected by the hydraulic servo unit to start the transfer of power, and orifice disposed in the first discharge oil passage and having a prescribed cross-sectional area, a second discharge oil passage for discharging the working oil from the first discharge oil passage, the second discharge oil passage communicating with the first discharge oil passage upstream of the orifice with respect to the direction in which the working oil flows through the first discharge oil passage, and a relief valve disposed in the second discharge oil passage and openable only when the pressure of the working oil in the second discharge passage is higher than the pressure of the working oil which is developed in the first discharge oil passage upstream of the orifice when the working oil is at a normal temperature.

The degree to which the flow of the working oil is restricted by the orifice may be modified by an orifice changing means depending on the magnitude of an indication of the throttle valve opening of the engine with which the transmission is associated.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
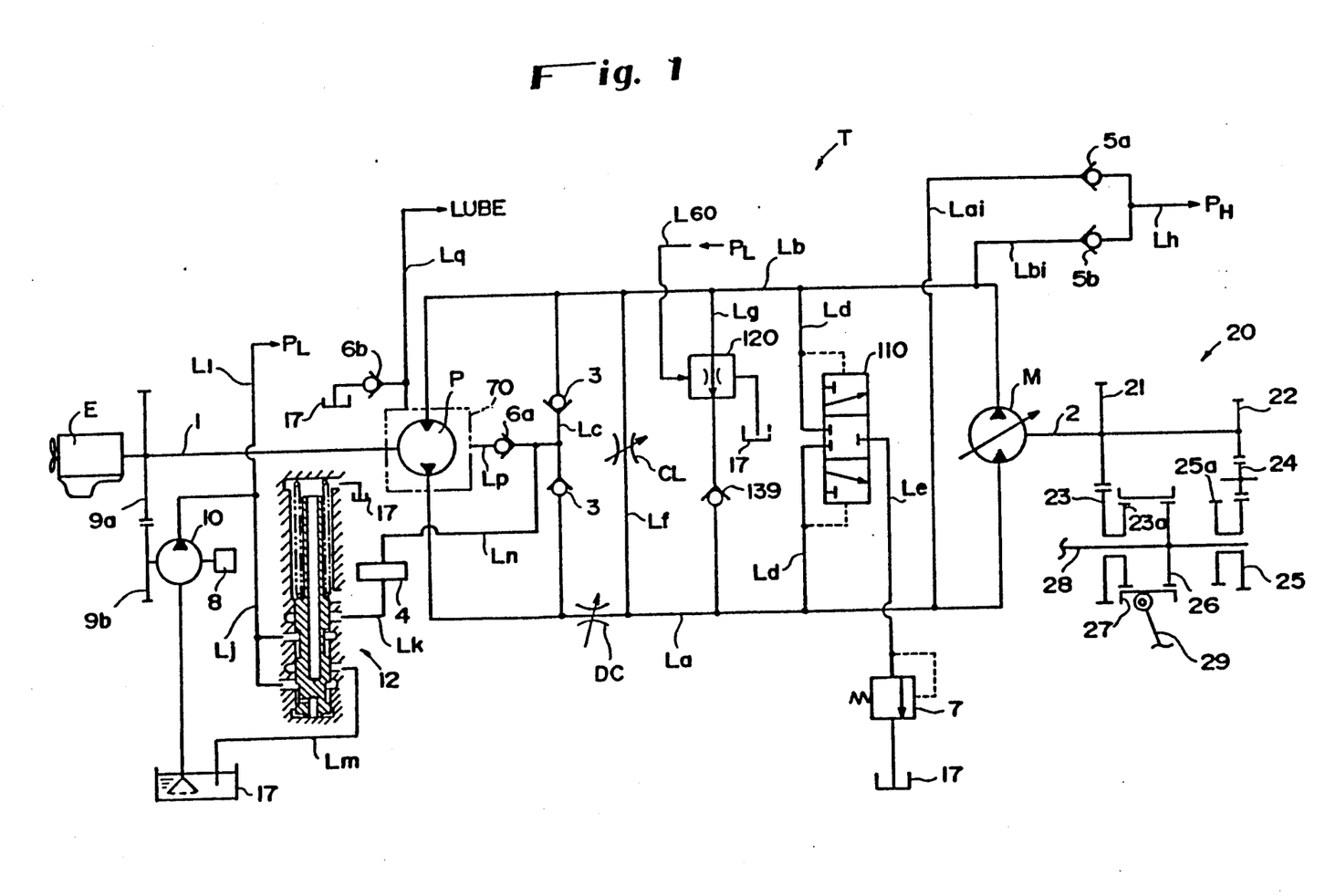
FIG. 1 is a circuit diagram of a hydraulic circuit of a hydraulically operated continuously variable transmission combined with a clutch control device according to the present invention.

As shown in FIG. 1, a hydraulically operated continuously variable transmission T is mounted on a motor vehicle and combined with a clutch control device according to the present invention. The continuously variable transmission T has a fixed-displacement swash-plate axial-plunger hydraulic pump P which can be driven by an engine E through an input shaft 1, and a variable-displacement swash-plate axial-plunger hydraulic motor M which can drive road wheels (not shown) of the motor vehicle through an output shaft 2 and a forward/reverse mode selector unit 20. The hydraulic pump P and the hydraulic motor M are interconnected by a closed hydraulic circuit which has a first oil passage La interconnecting the outlet port of the pump P and the inlet port of the motor M and a second oil passage Lb interconnecting the inlet port of the pump P and the outlet port of the motor M. The first oil passage La is supplied with oil under higher pressure and the second oil passage Lb is supplied with oil under lower pressure when the pump P is driven by the engine E and the motor M is rotated by the oil pressure from the pump P to drive the road wheels, i.e., when the road wheels are driven by the engine E through the continuously variable transmission T. The second oil passage Lb is supplied with oil under higher pressure and the first oil passage La is supplied with oil under lower pressure when the motor vehicle is subjected to engine braking due to drive forces from the road wheels such as when the motor vehicle is decelerated.

The first oil passage La has a direct clutch valve DC for selectively cutting off an oil flow through the first oil passage La.

A charging pump 10 drivable by the engine E through a pair of intermeshing drive and driven gears 9a, 9b has an outlet port connected to a regulator valve 12 through a pump outlet oil passage Lj from which a first control oil passage $L_1$ is branched. The regulator valve 12 operates depending on the oil pressure in the outlet oil passage Lj, for setting the oil pressure in the outlet oil passage Lj and the first control oil passage $L_1$ to a certain control line pressure $P_L$. Working oil having the control line pressure $P_L$ is supplied from the first control oil passage $L_1$ to a control valve.

The rate at which the working oil is supplied from the first control oil passage $L_1$ to the control valve is smaller than the rate at which the working oil is discharged from the charging pump 10. Remaining working oil is sent to a first charging oil passage Lk by the regulator valve 12. Any excessive working oil which remains in the regulator valve 12 even when the first charging oil passage Lk is supplied is returned through a drain oil passage Lm to a sump 17. The oil supplied to the first charging oil passage Lk is cleaned by a centrifugal oil filter 4, and then sent through a second charging oil passage Ln to a third oil passage Lc having a pair of check valves 3. The oil is then supplied to a lower-pressure one of the oil passages La, Lb through the check valves 3.

A first lubricating oil passage Lp communicating with the internal space of a motor cylinder 70 serving as a pump case is branched from the second charging oil passage Ln. Part of the oil supplied to the second charging oil passage Ln passes through a check valve 6a in the first lubricating oil passage Lp and is supplied through the oil passage Lp into the internal space of the motor cylinder 70. The oil supplied to the internal space lubricates the components of the pump P and is then sent out as lubricating oil through a second lubricating oil passage Lq. When the motor cylinder 70 rotates at a very low speed, such as when the engine is stopped, the working oil in the internal space of the motor cylinder 70 is discharged through a check valve 6b into the sump 17.

A governor valve 8 is coupled coaxially to the drive shaft of the charging pump 10. The governor valve 8 is supplied with working oil under a prescribed pressure from the control valve (not shown), and converts the pressure of the supplied working oil to a governor oil pressure corresponding to the rotational speed of the engine E. Input and output oil passages joined to the governor valve 8 will be described later on.

A fourth oil passage Ld having a shuttle valve 110 is connected to the closed hydraulic circuit. To the shuttle valve 110, there is connected a fifth oil passage Le having a lower-pressure relief valve 7 and connected to the oil sump 17. The shuttle valve 110 is operable depending on the pressure difference between the first and second oil passages La, Lb to connect a lower-pressure one of the first and second oil passages La, Lb to the fifth oil passage Le. Excess oil pressure in the fifth oil passage Le is relieved by the lower-pressure relief valve 7.

Between the first and second oil passages La, Lb there is also connected a sixth oil passage Lf for interconnecting these first and second oil passages La, Lb, the sixth oil passage Lf having a main clutch valve CL comprising a variable restriction or orifice for controlling the opening of the sixth oil passage Lf.

The first and second oil passages La, Lb are also interconnected by a seventh oil passage Lg having an engine braking control valve 120.

First and second branch oil passages Lai, Lbi are branched respectively from the first and second oil passages La, Lb, and connected to a high-pressure oil passage Lh through respective check valves 5a, 5b. The oil pressure $P_H$ from a higher-pressure one of the first and second oil passages La, Lb is supplied to the high-pressure oil passage Lh.

A final output shaft 28 extends parallel to the output shaft 2 of the hydraulic motor M, with the forward-/reverse mode selector unit 20 being disposed between the shafts 2, 28. The forward/reverse mode selector unit 20 comprises axially spaced first and second drive gears 21, 22 mounted on the output shaft 2, a first driven gear 23 rotatably supported on the final output shaft 28 and meshing with the first drive gear 21, a second driven gear 25 rotatably supported on the final output shaft 28 and meshing with the second drive gear 22 through an idle gear 24, a clutch hub 26 fixedly mounted on the final output shaft 28 and positioned axially between the first and second drive gears 23, 25, first and second clutch gears 23a, 25a joined to axial sides of the first and second driven gears 23, 25, respectively, and an axially slidable sleeve 27 for selectively connecting the clutch hub 26 to the clutch gear 23a or 25a. The sleeve 27 has an internal gear which can selectively mesh with the external gear of the clutch hub 26 and the clutch gears 23a, 25a. The sleeve 27 is axially movable by a shift fork 29 coupled thereto. The forward/reverse mode selector unit 20 is specifically shown in FIG. 2.

Figure 2:
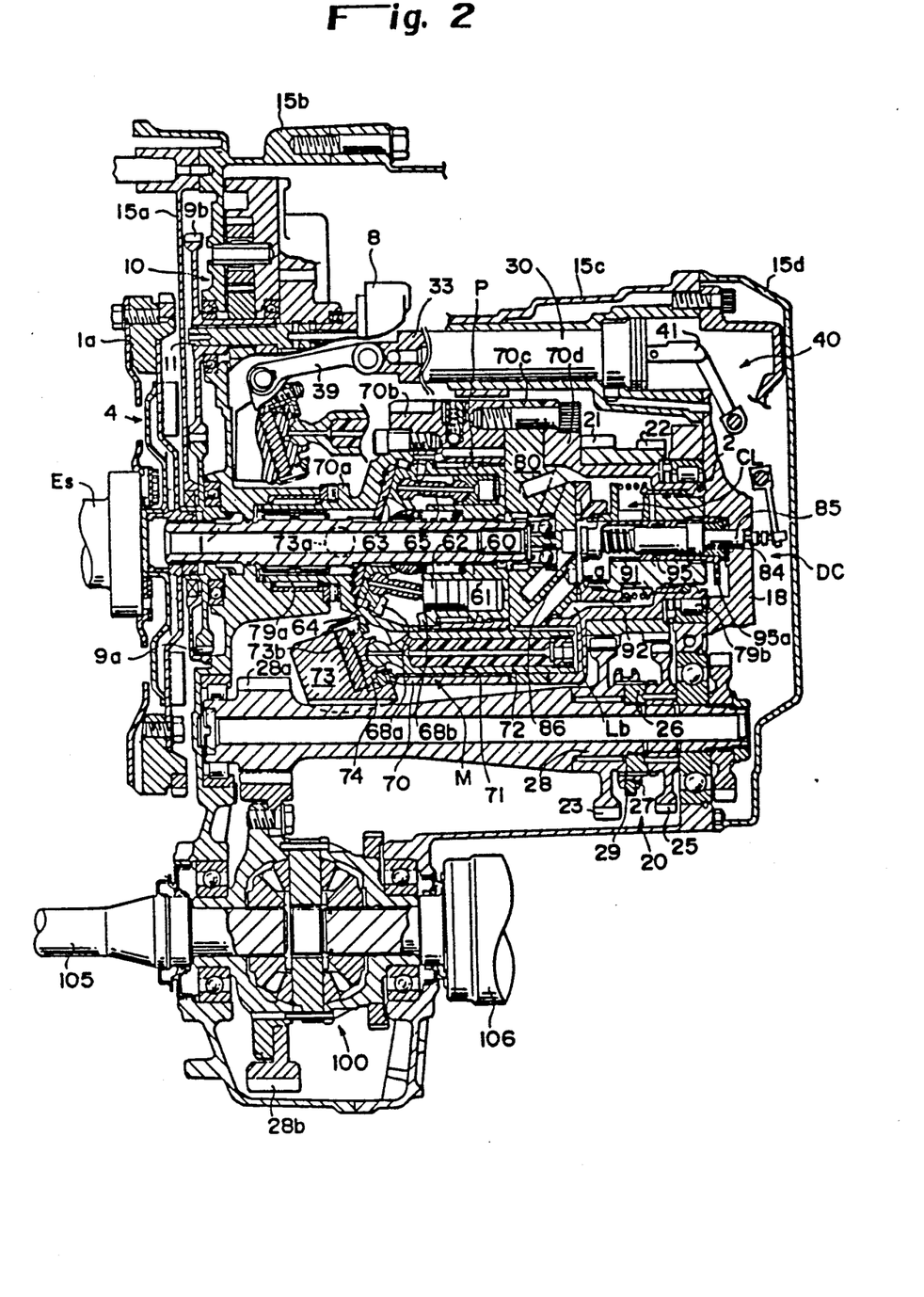
FIG. 2 is a cross-sectional view of the continuously variable transmission.

When the sleeve 27 is moved to the left by the shift fork 29, it interconnects the clutch gear 23a and the clutch hub 26. At this time, the final output shaft 28 is rotated in the opposite direction to the output shaft 2, so that the road wheels are rotated in a forward direction by the continuously variable transmission T. When the sleeve 27 is moved to the right by the shift fork 29, thus interconnecting the clutch gear 25a and the clutch hub 26, the final output shaft 28 is rotated in the same direction as the output shaft 2. Therefore, the road wheels are rotated in a reverse direction.

The continuously variable transmission T will now be described in greater detail with reference to FIG. 2.

The continuously variable transmission T has first, second, third, and fourth cases 15a, 15b, 15c, 15d defining a space therein in which the hydraulic pump P and the hydraulic motor M are coaxially disposed. The input shaft 1 of the hydraulic motor P is coupled to the crankshaft Es of the engine E through a flywheel 1a. The centrifugal filter 4 is positioned a radially inner recess ion the flywheel 1a.

The drive gear 9a is splined to the input shaft 1, and the driven gear 9b is held in mesh with the drive gear 9a. The driven gear 9b is coaxially connected to the drive shaft 11 of the charging pump 10. Therefore, the rotative power of the engine E is transmitted through the gears 9a, 9b to the drive shaft 11 of the charging pump 10, thus actuating the charging pump 10. The drive shaft 11 projects through the charging pump 10 remotely from the gear 9b, and is coupled to the governor valve 8. therefore, the rotative power of the engine E is also transmitted to the governor valve 8, which generates a governor oil pressure corresponding to the rotational speed of the engine E.

The hydraulic pump P comprises a pump cylinder 60 splined to the input shaft 1 and having a plurality of cylinder bores or holes 61 defined in the pump cylinder 60 at circumferentially equally spaced intervals, and a plurality of pump plungers 62 slidably fitted respectively in the cylinder holes 61. The hydraulic pump P can be driven by the power of the engine E which is transmitted through the input shaft 1.

The hydraulic motor M comprises a motor cylinder 70 disposed around the pump cylinder 60 and having a plurality of cylinder bores or holes 71 defined in the motor cylinder 70 at circumferentially equally spaced intervals, and a plurality of motor plungers 72 slidably fitted respectively in the cylinder holes 71. The hydraulic motor M is rotatable coaxially relatively to the pump cylinder 60.

The motor cylinder 70 comprises first, second, third, and fourth cylinder segments 70a, 70b, 70c, 70d which are arranged axially and joined together. The first segment 70a is rotatably supported at its lefthand end in the case 15b by a bearing 79a. The righthand end of the first segment 70a serves as a pump swash plate member inclined with respect to the input shaft 1. A pump swash plate ring 63 is mounted on the inner surface of the pump swash plate member. The cylinder holes 71 are defined in the second segment 70b. The third segment 70c has a distribution disc 80 in which there are defined oil passages leading to the cylinder holes 61, 71. The first and second drive gears 21, 22 are disposed on a gear member which is force-fitted over the fourth segment 70d, which is rotatably supported in the case 15c by a bearing 79b.

An annular pump shoe 64 is slidably rotatably mounted on the pump swash plate ring 63. The pump shoe 64 and the pump plungers 62 are operatively connected to each other through joint rods 65 which are swingable with respect to the pump shoe 64 and the pump plunger 62. The pump shoe 64 and the pump cylinder 60 have bevel gears 68a, 68b, respectively, which are held in mesh with each other. When the pump cylinder 60 is rotated by the input shaft 1, the pump shoe 64 is also rotated in the same direction, and the pump plungers 62 are reciprocally moved over strokes depending on the angle of inclination of the pump swash plate ring 63 for thereby drawing oil from the inlet port of the hydraulic pump P and discharging oil from the outlet port thereof.

A swash plate member 73 confronting the motor plungers 72 is swingably supported in the second case 15b by a pair of trunnions (pivot shafts) 73a projecting from outer opposite ends of the swash plate member 73 in a direction normal to the sheet of FIG. 2. A motor swash plate ring 73b is mounted on the surface of the swash plate member 73 which faces the motor plungers 72. A motor shoe 74 is slidably disposed on the motor swash plate ring 73b. The motor shoe 74 is relatively swingably connected to confronting ends of the motor plungers 72. The swash plate member 73 is coupled to a piston rod 33 of a first transmission servo unit 30 through a link 39 at a position remote from the trunnions 73a. When the piston rod 33 is axially moved by the first transmission servo unit 30, the swash plate member 73 is angularly moved about the trunnions 73a.

The fourth segment 70d of the motor cylinder 70 is of a hollow construction in which a fixed shaft 91 secured to a pressure distribution disc 18 is inserted. A distribution ring 92 is fitted in a fluidtight manner over the lefthand end of the fixed shaft 91. The distribution ring 92 has an axial lefthand end face held in sliding contact with the distribution disc 80 in eccentric relation thereto. The distribution ring 92 divides the hollow space in the fourth segment 70d into an inner oil chamber and an outer oil chamber. The inner oil chamber serves as the first oil passage La, and the outer oil chamber serves as the second oil passage Lb. Although not illustrated in FIG. 2, the pressure distribution disc 18 has the shuttle valve 110 and the lower-pressure relief valve 7, which are shown in FIG. 1. The pressure distribution disc 18 is attached to a righthand side surface of the third case 15c, and covered by the fourth case 15d.

The distribution disc 80 has a pump outlet port and a pump inlet port. The cylinder holes 61 in which the pump plungers 62 operate in a discharge stroke are held in communication with the first oil passage La through the pump outlet port and a discharge passage connected thereto. The cylinder holes 61 in which the pump plungers 62 operate in a suction stroke are held in communication with the second oil passage Lb through the pump inlet port and a suction passage connected thereto. The distribution disc 80 also has communication passages 83 communicating with the cylinder holes (cylinder chambers) 71 in which the respective motor plungers 72 are slidably disposed. The open ends of the communication passages 83 are selectively brought by the distribution ring 92 into communication with the first oil passage La or the second oil passage Lb depending on the rotation of the motor cylinder 70. The cylinder holes 71 receiving the motor plungers 72 in an expansion stroke are held in communication with the first oil passage La through the communication passages, 83 whereas the cylinder holes 71 receiving the motor plungers 72 in a contraction stroke are held in communication with the second oil passage Lb through the communication passages 83.

The closed hydraulic circuit is defined between the hydraulic pump P and the hydraulic motor M through the distribution disc 80 and the distribution ring 92. When the pump cylinder 60 is driven by the input shaft 1, higher-pressure working oil produced by the pump plungers in the discharge stroke flows from the pump outlet port through the pump discharge passage, the first oil passage La, and the first communication passages which communicate with the first oil passage La into those cylinder holes 71 which receive the motor plungers 72 in the expansion stroke, thus applying a thrusting force to these motor plungers 72. Working oil discharged from those motor plungers 72 which are in the contraction stroke flows through the second communication passages which communicate with the second oil passage Lb, the pump suction passage, and the pump inlet port into the cylinder holes 61 receiving those pump plungers 62 which are in the suction stroke.

Upon such circulation of the working oil, the motor cylinder 70 is rotated by the sum of the reactive torque which is given to the motor cylinder 70 through the pump swash plate ring 63 by the pump plungers 62 in the discharge stroke and the reactive torque which is received from the motor swash plate member 73 by the motor plungers 72 in the expansion stroke.

The transmission ratio, or speed reduction ratio, of the motor cylinder 70 to the pump cylinder 60 is given by the following equation:

$$\text{Transmission ratio} = \frac{\text{Rotational speed of the pump cylinder 60}}{\text{Rotational speed of the motor cylinder 70}}$$

$$= 1 + \frac{\text{Displacement of the hydraulic motor } M}{\text{Displacement of the hydraulic pump } P}$$

As is apparent from the above equation, the transmission ratio can be varied from 1 (minimum value) to a certain necessary value (maximum value) by angularly moving the swash plate member 73 with the transmission servo unit 30 to vary the displacement of the hydraulic motor M from zero to a certain value.

As described above, the gear member with the first and second drive gears 21, 22 is force-filled over the fourth segment 70d of the motor cylinder 70. Therefore, the rotative drive force from the motor cylinder 70 is transmitted through the forward/reverse mode selector unit 20 to the final output shaft 28. The final output shaft 28 is connected through final gears 28a, 28b to a differential 100. Accordingly, the rotative drive force from the final output shaft 28 is transmitted to the differential 100. The rotative drive force is then split by the differential 100 and transmitted to a pair of drive axles 105, 106 which drive the road wheels (not shown) connected respectively thereto.

The fixed shaft 91 inserted in the fourth segment 70d has a bypass passage interconnecting the first and second oil passages La, Lb. The main clutch valve CL, which controls the opening of the bypass passage from a fully closed condition to a fully open condition, and the direct clutch valve DC, which selectively cuts off the first oil passage La, are disposed in the fixed shaft 91.

The main clutch valve CL will be described below. The fixed shaft 91 has a bypass port defined radially in a peripheral wall thereof and providing communication between the first and second oil passages La, Lb. The main clutch valve CL has a cylindrical main clutch valve body 95 inserted in the hollow space in the fixed shaft 91. The valve body 95 is rotatable relatively to the fixed shaft 91 and has a bypass hole defined therein and positionable in registry with the bypass port. The valve body 95 has an arm 95a on its righthand end. By turning the arm 95a, the valve body 95 is angularly moved about its own axis to adjust the degree to which the bypass port and the bypass hole are overlapped. The size of the overlapping opening of the bypass port and the bypass hole corresponds to the opening of the bypass passage between the first and second oil passages La, Lb. Accordingly, the opening of the bypass passage can be controlled from the fully open condition to the fully closed condition by turning the valve body 95. When the bypass passage is fully open, working oil discharged from the pump discharge port into the first oil passage La flows from the bypass port and the bypass hole directly into the second oil passage Lb and also into pump inlet port. Therefore, the hydraulic motor M is disabled, and the clutch is in an "OFF" condition. Conversely, when the bypass passage is fully closed, the clutch is in an "ON" condition.

The direct clutch valve DC is disposed in the hollow space in the main clutch valve body 95. The direct clutch valve DC comprises a piston shaft 85 axially movably disposed in the valve body 95, a shoe 86 mounted on an inner end of the piston shaft 85, and a pilot spool 84 axially slidably inserted in the piston shaft 85. By axially moving the pilot spool 84, the piston shaft 85 is axially moved while catching up with the pilot spool 84. For example, when the pilot spool 85 is moved to the left, the piston shaft 85 is also moved to the left to enable the shoe 86 to close the pump discharge passage which is open at the confronting end face of the distribution disc 80, thus cutting off the first oil passage La. With the pump discharge passage thus closed, the pump plungers 62 are hydraulically locked, and the hydraulic pump P and the hydraulic motor M are directly coupled to each other.

A hydraulic circuit for controlling the continuously variable transmission T thus constructed will be described below with reference to FIGS. 3 and 4.

The controlling hydraulic circuit includes a clutch servo unit 130 for controlling the main clutch CL, a forward/reverse servo unit 140 for controlling the forward/reverse mode selector unit 20, and first and second transmission servo units 30, 50 for angularly moving the swash plate member 70 to control the transmission ratio. These units are operated by illustrated hydraulic valves to effect various modes of operation.

The construction an operation of the units 130, 140, 30, 50 will now be described below.

Figure 3:
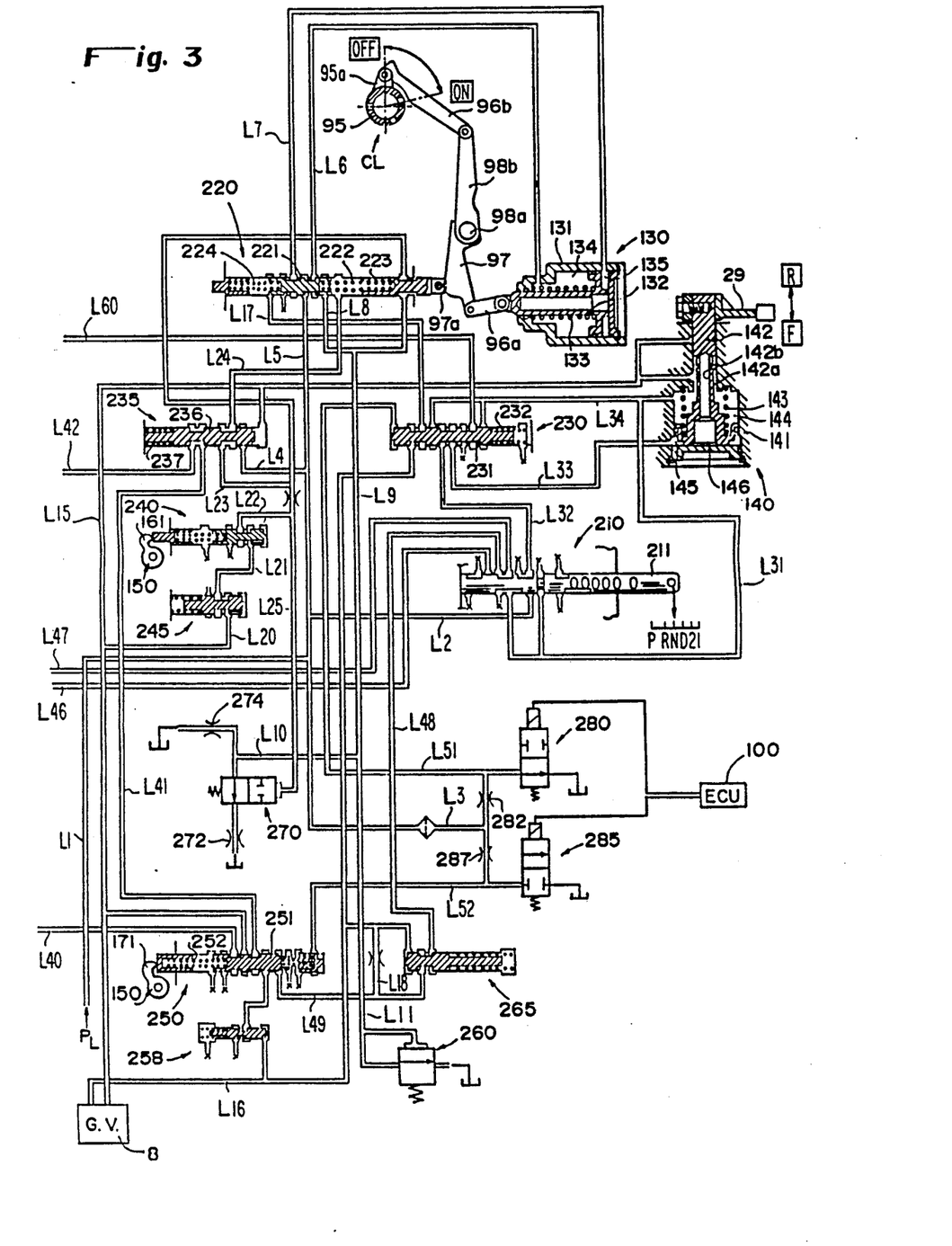
FIGS. 3 and 4 are circuit diagrams of a control circuit for the continuously variable transmission.
Figure 4:
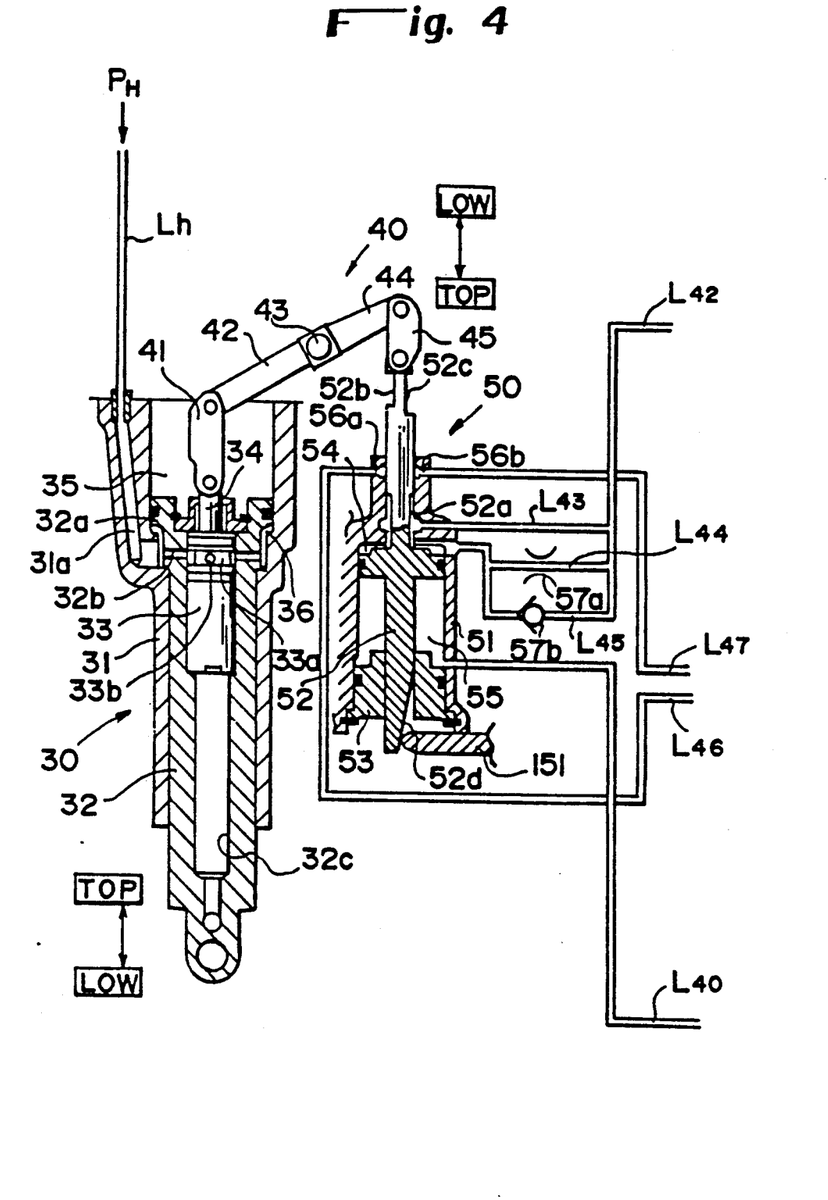

The clutch servo unit 130 comprises a fixed cylinder 131, a piston assembly 132 axially slidably fitted in the cylinder 131, and a spring 133 disposed around the piston assembly 132 for normally urging the piston assembly 132 to move to the right (FIG. 3). The piston assembly 132 has a piston which divides the interior of the cylinder 131 into left and right cylinder chambers 134, 135 with which sixth and seventh control oil passages $L_6$, $L_7$ connected to a clutch control valve 220 communicate, respectively. Therefore, the piston assembly 132 is selectively movable to the left and right under the pressure of working oil which is selectively supplied to and discharged from the cylinder chambers 134, 135 by the clutch control valve 220.

The piston assembly 132 has a lefthand end coupled to a cam 97 through a link 96a. The cam 97 has a cam surface 97a held against the end of a righthand spool 223 of the clutch control valve 220. The cam 97 has one end fixed to a rotatable shaft 98a to which a link arm 98b is also secured. The link arm 98b has a distal end coupled through a link 96b to an arm 95a integrally formed with the main clutch valve body 95. Therefore, when the piston assembly 132 is moved to the left or right, the cam 97 and the link arm 98b are angularly moved in unison about the shaft 98a, thus turning the main clutch valve body 95 from an illustrated OFF position (open position) to an ON position (closed position). At this time, the cam surface 97a pushes the righthand spool 223 to the right as the cam 97 is angularly moved.

The clutch control valve 220 comprises a lefthand spool 221 and the righthand spool 223 which are axially movable, a spring 222 disposed between the spool 221, 223 and a spring 224 for normally urging the lefthand spool 221 to move to the right. The spring 224 is positioned in a space (on the lefthand side of the lefthand spool 221) which is held in communication with a seventeenth control oil passage $L_{17}$ that communicates through a clutch-on valve 230 with a sixteenth control oil passage $L_{16}$ communicating with the outlet port of the governor valve 8. Thus, the lefthand space in the clutch control valve 220 is supplied with governor pressure $P_G$ commensurate with the rotational speed of the engine E. The spring 222 is disposed in a space (defined between the lefthand and righthand spools 221, 223) which is supplied with a throttle pressure $P_{TH}$ commensurate with the throttle valve opening from a throttle valve 240 through a twenty-second control oil passage $L_{22}$, a twenty-third control oil passage $L_{23}$, a clutch-off valve 235, and a twenty-fourth control oil passage $L_{24}$.

Consequently, the lefthand spool 221 is moved to the right or left under a rightward force from the governor pressure $P_G$ and the spring 224 and a leftward force from the throttle pressure $P_{TH}$ and the spring 222. Depending on the movement of the lefthand spool 221, the line pressure $P_L$ supplied from the first control oil passage $L_1$ to a fifth control oil passage $L_5$ is supplied to one of the sixth and seventh control oil passage $L_6$, $L_7$, and working oil from the other oil passage is drained. The piston assembly 132 of the clutch serve unit 130 is therefore operated to control the operation of the main clutch CL. As the piston assembly 132 moves, it enables the cam 97 to move the righthand spool 223 to change the resilient force from the spring 222, so that the main clutch CL can be opened and closed according to desired characteristics.

When working oil is discharged from the lefthand cylinder chamber 134 through the sixth control oil passage $L_6$ in order to shift the clutch CL from the OFF condition to the ON condition, the working oil is delivered from the clutch control valve 220 through eighth, ninth, and tenth control oil passages $L_8$, $L_9$, $L_{10}$. The tenth control oil passage $L_{10}$ is connected through a first orifice 274 to a drain tank and also through an orifice changing valve 270 in the form of a shutoff valve and a second orifice 272 to the drain tank. These orifices 272, 274 serve to limit the speed at which the working oil is discharged, thereby optimizing the speed at which the clutch CL is connected (i.e., the speed at which the clutch CL is shifted from the OFF condition to the ON condition). It is desirable that the speed at which the clutch CL is connected be slower when the throttle valve opening is larger. To meet this demand, when the throttle valve opening becomes larger than a certain opening, the orifice changing valve 270 is operated under the throttle pressure $P_{TH}$ which is delivered from the throttle valve 240 through a twenty-fifth control oil passage $L_{25}$, to prevent the working oil from being discharged through the second orifice 272. Therefore, the speed at which the clutch CL is connected is reduced.

Figure 7:
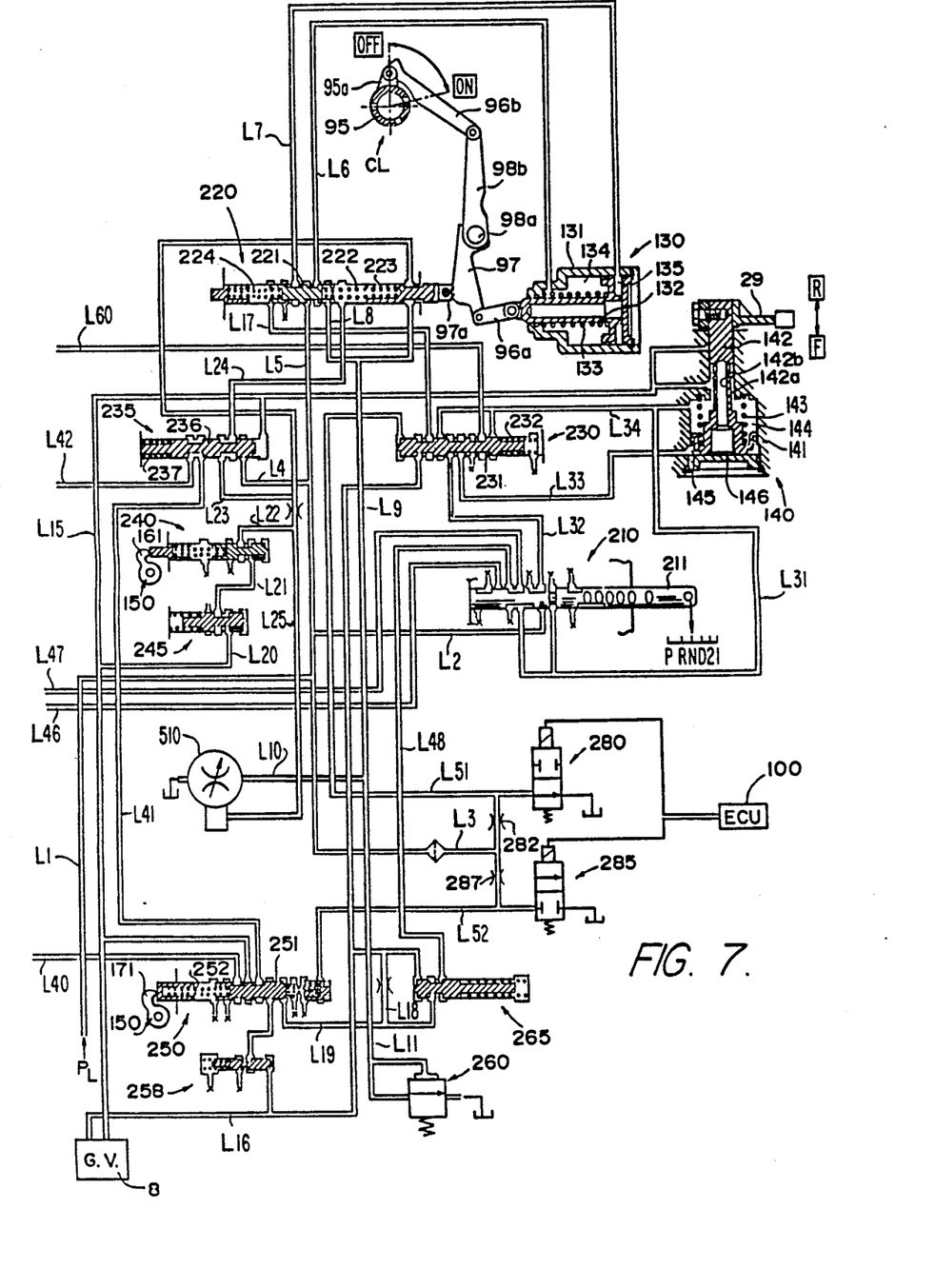
FIG. 7 is a circuit diagram of a control circuit for the continuously variable transmission.

Rather than providing the two orifices 272, 274 and the orifice changing valve 270, the tenth control oil passage $L_{10}$ may be connected to the drain tank through a variable orifice 510 (FIG. 7), and the diameter of the variable orifice may be controlled depending on the throttle pressure $P_{TH}$. In such a modification, the orifice diameter is controlled so as to be smaller as the throttle pressure $P_{TH}$ becomes larger.

The clutch CL is connected at a desired speed by thus adjusting the speed at which the working oil is discharged from the lefthand cylinder chamber 134 of the clutch servo unit 130. However, inasmuch as such discharging speed adjustment is effected by the fixed orifices 272, 274, the discharging speed is affected by the viscosity of the working oil. For example, when the temperature of the working oil is low at the time the engine E is started at a low temperature, the working oil is discharged from the lefthand cylinder chamber 134 at a very low speed, with the result that the clutch CL is connected at a very low speed.

To solve this problem, an eleventh control oil passage $L_{11}$ having a relief valve 260 is branched from the tenth control oil passage $L_{10}$ in view of the fact that when the working oil is discharged at a low speed from the fixed orifices 272, 274 at a low temperature, the pressure of working oil in an upstream oil pressure is higher than normal. The relief valve 260 is arranged to relieve the working oil pressure when the oil pressure in the oil passage $L_{11}$ is higher than would be at a normal working oil temperature (e.g., 80° C.). Therefore, when the working oil temperature is low and the resistance to the flow of working oil through the orifices 272, 274 is large, resulting in a higher working oil pressure in the oil passage $L_{11}$, the relief valve 260 is opened to discharge the working oil in compensation for the reduced oil flow from the fixed orifices 272, 274. As a consequence, the clutch CL is connected smoothly. Even when the engine E is started at a low temperature, therefore, the clutch CL is connected without a delay, and the motor vehicle is started smoothly.

Figure 5:
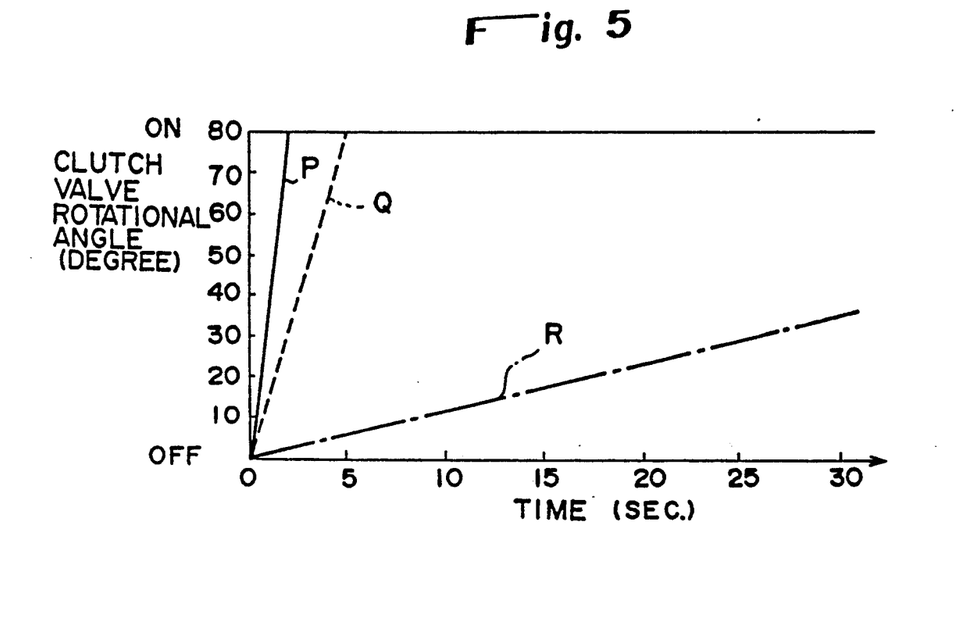
FIG. 5 is a graph showing the relationship between clutch valve angles and time.
Figure 6:
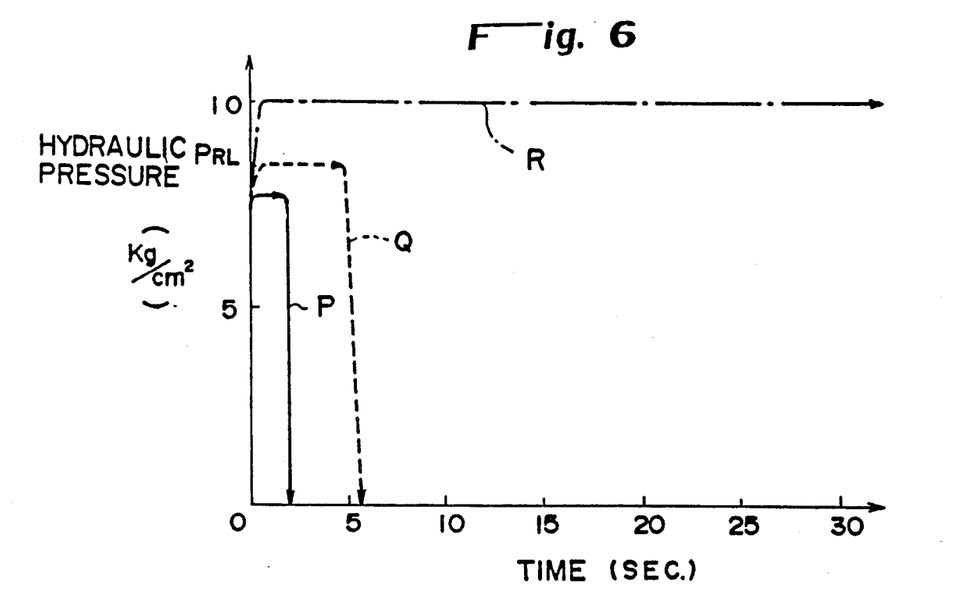
FIG. 6 is a graph showing the relationship between the hydraulic pressure in a clutch working oil drain passage and time.

The above clutch operation will be described below in greater detail with reference to FIGS. 5 and 6. FIG. 5 is a graph having a vertical axis representing the angular displacement of the clutch valve 95 (the clutch is OFF or fully open at 0° and ON or fully closed at 80°), and a horizontal axis representing time t. The solenoid-line curve P indicates the connection of the clutch when the working oil temperature is normal (80° C.), the dotted-line curve Q indicates the connection of the clutch when the working oil temperature is low (−30° C.), and the dot-and-dash-line curve R indicates the connection of the clutch when the relief valve 260 is dispensed with and the working oil temperature is low (−30° C.). FIG. 6 is a graph having a vertical axis representative of the pressure of working oil in the discharge oil passages (i.e., the control oil passage $L_8$, $L_9$, $L_{10}$, $L_{11}$) and a horizontal axis representative of time t.

When the clutch is connected according to the solid-line curve P (i.e., when the working oil temperature is 80° C.), the pressure of the working oil in the discharge oil passages is about 7.5 kg/cm², which is lower than the relief pressure $P_{RL}$ of the relief valve 260, and the working oil can be discharge through only the fixed orifices 272, 274 within a matter of about 2 through 3 seconds. If it were not for the relief valve 260 and when the working oil pressure is −30° C., the working oil pressure would not be fully connected after elapse of even 30 seconds. With the relief valve 260 connected, when the working oil pressure reaches the relief pressure $P_{RL}$ which is about 8 kg/cm², the relief valve 260 is opened to discharge the working oil therethrough. Then, the clutch is fully connected within 2 through 6 seconds as indicated by the dotted-line curve Q. Therefore, the clutch can be connected relatively rapidly even at a low temperature, and the motor vehicle can be started smoothly.

The forward/reverse servo unit 140 comprises a fixed cylinder 141, a piston assembly 142 axially (vertically in FIG. 3) movably fitted in the cylinder 141, and a spring 142 for normally urging the piston assembly 142 to move downwardly. The interior space of the cylinder 141 which is closed by a cover 146 is divided into upper and lower cylinder chambers 144, 145 by the piston of the piston assembly 142. The upper and lower cylinder chambers 144, 145 communicate respectively with thirty-first and thirty-third control oil passages $L_{31}$, $L_{33}$.

The oil passages $L_{31}$, $L_{33}$ are connected to a manually operated valve 210 directly and through the clutch-on valve 230 and a thirty-second control oil passage $L_{32}$. When the manually operated valve 210 is in D, $L_2$, and $L_1$ positions (which are indicated as D, 2, 1 positions, respectively, in FIG. 3), the line pressure $P_L$ from a control oil passage $L_2$ and the thirty-third control oil passage $L_{33}$ is supplied with the line pressure $P_L$, and the thirty-first control oil passage $L_{31}$ is connected to the drain tank. Therefore, when one of the D, $L_2$, and $L_1$ positions is selected by the manually operated valve 210, the piston assembly 142 is moved downwardly as shown to position the shift fork 29 fixed to the distal end of the piston assembly 142 in a forward position. When the R position is selected by the manually operated valve 210, the piston assembly 142 is moved upwardly to bring the shift fork 29 into a reverse position. In other positions, i.e., N and P positions, the control oil passages $L_{31}$, $L_{33}$ are connected to the drain tank. At this time, the piston assembly 142 is held in the lower position under the bias of the spring 143 to hold the shift fork 29 in the forward position.

When the upper cylinder chamber 144 is supplied with the line pressure $P_L$ to move the piston assembly 142 downwardly, the line pressure $P_L$ is introduced through a groove 142a defined in the outer circumferential surface of the piston assembly 142 into a fifteenth control oil passage $L_{15}$. When the lower cylinder chamber 145 is supplied with the line pressure $P_L$ to move the piston assembly 142 upwardly, the line pressure $P_L$ is introduced into the fifteenth control oil passage $L_{15}$ through a hole 142b defined in the piston assembly 142.

The first transmission servo unit 30 comprises a fixed cylinder 31, a piston rod 32 vertically movably fitted in the cylinder 31, a valve 33 fixedly held in the piston rod 32, and a spool 34 vertically movably inserted in the valve 33. The cylinder 31 has an internal space defined therein and closed at its upper end by a cover (not shown). The internal space in the cylinder 31 is divided into upper and lower cylinder chambers 35, 36 by the piston 32a of the piston rod 32. The piston rod 32 has a lower end projecting out of the cylinder 31 and coupled to the swash plate member 73 of the motor M through the link 39 (FIG. 2.)

The cylinder 31 is connected to the high-pressure oil passage Lh and has a high-pressure introducing hole 31a defined therein which connects the high-pressure oil passage Lh to the lower cylinder chamber 36. The lower cylinder chamber 36 is supplied with working oil which has the higher hydraulic pressure $P_H$ is introduced through a communication hole 32b defined in the piston rod 32 into a groove 33a defined in the valve 33, from which the working oil is introduced into a spool insertion hole (not shown) in the valve 33 through a communication hole 33b defined in the valve 33.

When the spool 34 inserted in the spool insertion hole is moved upwardly relatively to the valve 33, it closes the communication hole 33b and discharges working oil from the upper cylinder chamber 35 to the drain tank through a communication hole 32c in the piston rod 32. When the spool 34 is moved downwardly relatively to the valve 33, it brings the communication hole 33b into communication with the upper cylinder chamber 35. Therefore, upon ascent of the spool 34, the piston rod 32 is moved upwardly with the spool valve 34 under the high pressure $P_H$ acting in the lower cylinder 36. Upon descent of the spool 34, the high pressure $P_H$ acts in the upper and lower cylinder chambers 35, 36 and the piston rod 32 is lowered with the spool 34 due to the difference between the pressure-bearing areas of the piston assembly 32 (the pressure-bearing area facing the upper cylinder chamber 35 is larger than that which faces the lower cylinder chamber 36). When the spool 34 is held at rest, the piston rod 32 is also held at rest in a position where the forces applied to the piston assembly 32a from the upper and lower cylinder chambers 35, 36 are kept in equilibrium. Stated otherwise, when the spool 34 is vertically moved, the piston rod 32 is also vertical moved in unison therewith. Since the piston rod 32 is coupled to the swash plate member 73 of the motor M, the swash plate angle, i.e., the transmission ratio or speed reduction ratio of the transmission T can be controlled by moving the spool 34.

The upper end of the spool 34 is coupled through a first link 41 to one end of a second link 42 which is integrally joined to a rotatable shaft 43 for angular movement about the axis of the shaft 43. To the shaft 43, there is also integrally joined a third link 44 which is connected through a fourth link 45 to a piston assembly 52 of the second transmission servo unit 50. When the piston assembly 52 is vertically moved, the spool 34 of the first transmission servo unit 30 is vertically moved through the link mechanism 40 which is constructed of the links 41 through 45.

The piston assembly 52 is axially (vertically in FIG. 4) movably fitted in the fixed cylinder 51. The fixed cylinder 51 has an internal space closed by a plug 53 and divided by the piston of the piston assembly 52 into upper and lower cylinder chambers 54, 55. The upper cylinder chamber 54 is held in communication with a forty-second control oil passage $L_{42}$ through a forty-forth control oil passage $L_{44}$ having an orifice 57a and a forty-fifth control oil passage $L_{45}$ having a check valve 57b. The lower cylinder chamber 55 communicates with a fortieth control oil passage $L_{40}$. The forty-second control oil passage $L_{42}$ communicates with a shift control valve 250 (FIG. 3) through the clutch-off valve 235 and a forty-first control oil passage $L_{41}$, and the fortieth control oil passage $L_{40}$ communicates directly with the shift control valve 250.

The shift control valve 250 is operated to supply the line pressure $P_L$ from the fifteenth control oil passage $L_{15}$ to the upper and lower cylinder chambers 54, 55 or discharge working oil from these cylinder chambers. Depending on whether the working oil is supplied to or discharged from the cylinder chambers 54, 55, the piston assembly 52 is vertically moved to cause the link mechanism 40 to operate the first transmission servo unit 30 for the control of the transmission ratio. More specifically, when the piston assembly 52 of the second transmission servo unit 50 is moved upwardly to lower the piston assembly 32 of the first transmission servo unit 30, the transmission ratio is increased (i.e., the transmission is shifted to the LOW position). Conversely, when the piston assembly 52 is moved downwardly to lift the piston assembly 32, the transmission ratio is reduced (i.e., the transmission is shifted to the TOP position).

The line pressure $P_L$ is supplied slowly to the upper cylinder chamber 54 through the orifice 57a. However, the working oil can be discharged quickly from the upper cylinder chamber 54 through the check valve 57b. Therefore, the piston assembly 52 can quickly be moved upwardly to increase the transmission ratio (i.e., the transmission is shifted to the LOW position), but the piston assembly 52 is slowly moved downwardly to reduce the transmission ratio (i.e., the transmission is shifted to the TOP position). The piston assembly 52 has a first groove 52a defined in its outer circumferential surface near its piston. When the transmission ratio is large (i.e., when the piston assembly 52 has been moved beyond a certain interval), a forty-third control oil passage $L_{43}$ communicating with a hole defined in the cylinder 51 is brought into communication with the upper cylinder chamber 54 through the first groove 52a. Therefore, while the piston assembly 52 is being vertically moved until the transmission ratio becomes smaller than a certain value, the line pressure $P_L$ is supplied through the forty-third control oil passage $L_{43}$ to vary the transmission ratio quickly.

The piston assembly 52 has a tapered surface 52d on its lower end which is held against the end face of a spool 151 of a throttle cam mechanism 150 (FIG. 3). The throttle cam mechanism 150 is thus operable depending on the transmission ratio.

The cylinder 51 has defined in its upper portion two communication holes 56a, 56b opening into the hole in the cylinder 51 in which the piston assembly 52 is inserted. The communication holes 56a, 56b are held in communication respectively with forty-sixth and forty-seventh control oil passages $L_{46}$, $L_{47}$. The piston assembly 52 has grooves 52b, 52c defined in its upper end which connect the communication holes 56a, 56b to the drain tank when the piston assembly 52 is moved downwardly beyond a certain interval. When the piston assembly 52 is moved downwardly to reduce the transmission ratio (toward the TOP position), the forty-seventh control oil passage $L_{47}$ is first connected to the drain tank through the groove 52c and the communication hole 56b. Upon further downward movement of the piston assembly 52, the forty-sixth control oil passage $L_{46}$ is then connected to the drain tank through the groove 52b and the communication hole 56a.

The valves shown in FIGS. 3 and 4 will briefly be described below.

The manually operated valve 210 has its spool 211 operable in response to operation of a shift lever at the driver's seat for controlling the operation of the forward/reverse servo unit 140. When the spool 211 is in the "2" position ($L_2$ position), it holds a forty-eighth control oil passage $L_{48}$ having the governor pressure in communication with the forty-sixth control oil passage $L_{46}$. When the spool 211 is in the "1" position ($L_1$ position), it holds the forty-eighth control oil passage $L_{48}$ in communication with the forty-seventh control oil passage $L_{47}$. therefore, with the spool 211 in the "2" or "1" position, when the transmission ratio is reduced beyond a certain value, the governor pressure in the forty-eighth control oil passage $L_{48}$ is drained. The governor pressure applied to the shift control valve 250 is reduced to zero, thereby preventing the transmission ratio from becoming lower (toward the TOP position).

The clutch-on valve 230 has a spool 231 normally biased to a leftward position as shown under the force of a spring 232. When a controller 100 detects that the speed of travel of the motor vehicle exceeds a certain speed, a first normally open solenoid valve 280 is closed to cause the line pressure $P_L$ from a third control oil passage $L_3$ to build up in a fifty-first control oil passage $L_{51}$, thus moving the spool 232 to the right. The seventeenth control oil passage $L_{17}$ is now supplied with the line pressure $P_L$ from a thirty-fourth control oil passage $L_{34}$ to move the lefthand spool 221 of the clutch control valve 220 to the right, thereby holding the main clutch CL in the ON condition (connected) irrespective of which condition it has been in. At the same time, the engine braking control valve 120 shown in FIG. 1 is also supplied with the lone pressure $P_L$ from a sixtieth control oil passage L60. At this time, the thirty-third control oil passage L33 connected to the lower cylinder chamber 144 of the forward/reverse servo unit 140 communicates with the drain tank, so that the servo unit 140 will not be operated for safety even if the manually operated valve 210 is shifted to the reverse (R) position while the motor vehicle is running.

The clutch-off valve 235 has a spool 236 which is moved to the left as shown under the line pressure $P_L$ applied to the righthand end thereof from the fifteenth control oil passage $L_{15}$ when the manual valve 210 is in any of the positions other than the N and P positions. When the manually operated valve 210 is shifted to the N or P position, the spool 236 is moved to the right under the bias of the spring 237. When the spool 236 is moved to the right, the twenty-fourth control oil passage $L_{24}$ is supplied with the line pressure $P_L$ from a fourth control oil passage L4, moving the lefthand spool 221 of the clutch control valve 220 to the left thereby to bringing the main clutch CL into the OFF condition. Simultaneously, the forty-second control oil passage $L_{42}$ is closed to hold the piston assembly 52 of the second transmission servo unit 50, so that the transmission ratio is held as it is.

A throttle modulator valve 245 generates a modulator pressure $P_M$ by lowering the line pressure $P_L$ supplied to a twentieth control oil passage $L_{20}$, and supplies the modulator pressure $P_M$ through a twenty-first control oil passage $L_{21}$ to the throttle valve 240.

The throttle valve 240 is operable by being pushed by a first cam 161 of the throttle cam mechanism 150 which is actuatable by the accelerator pedal or depending on the throttle valve opening. When operated, the throttle valve 240 supplies the twenty-second control oil passage $L_{22}$ with the throttle pressure $P_{TH}$ corresponding to the throttle valve opening (or accelerator opening).

The shift control valve 250 has a spool 251 to which there are applied a force transmitted from a second cam 171 of the throttle cam mechanism 150 through a spring 252 and a force produced by the governor pressure $P_G$ from a forty-ninth control oil passage $L_{49}$. The spool 251 is thus movable to the left or right under these forces to control the supply of the line pressure $P_L$ to or the discharge of the line pressure $P_L$ from the upper and lower cylinder chambers 54, 55 of the second transmission servo unit 50. The shift control valve 250 therefore controls the transmission ratio depending on the throttle valve opening (or the depression of the accelerator pedal).

A kickdown control valve 258 serves to discharge working oil from the forty-second control oil passage $L_{42}$ to increase the transmission ratio (toward the TOP position) when the accelerator pedal is abruptly depressed while the motor vehicle is running.

An engine rotation inhibitor valve 265 is operated to cut off communication between the forty-eighth control oil passage $L_{48}$ and the forty-ninth control oil passage $L_{49}$ when the engine rotational speed exceeds a predetermined speed to increase the governor pressure $P_G$ beyond a certain level.

A second solenoid valve 285 comprises a normally closed valve which can be opened when an abrupt braking action is detected by the controller 100. Normally, the line pressure $P_L$ is applied to the righthand end of the shift control valve 250. When the motor vehicle is abruptly braked, the line pressure $P_L$ applied to the righthand end of the shift control valve 250 is released to allow the spool 251 thereof to move to the right, thus shifting the transmission ratio toward the LOW position.

The clutch control device thus constructed offers the following advantages: When the clutch is to be connected, working oil discharged from the hydraulic servo unit flows through the first discharge oil passage. Since the flow rate of the discharged working oil is restricted by the orifice in the first discharge oil passage, the clutch is connected at an adequate speed when the temperature of the working oil discharged through the first discharge oil passage is normal. When the working oil temperature is low, because the orifice presents greater resistance to the oil flow, the oil pressure upstream of the orifice is increased, thus opening the relief valve in the second discharge oil passage to discharge the working oil also through the second discharge oil passage. Therefore, when the working oil temperature is low, the flow rate through the orifice is lowered, but the flow rate of the working oil discharged from the servo unit is prevented from being lowered since the second discharge oil passage is opened. As a consequence, when the working oil temperature is low, the servo unit is prevented from being delayed in operation and the clutch is prevented from being connected with a delay, with the result that the clutch can well be controlled at all times.

To connect the clutch when the throttle valve opening is small, the working oil is discharged from the hydraulic servo unit through an orifice having a large cross-sectional area which imposes smaller resistance to the oil flow. Therefore, the clutch is connected at a higher speed. To connect the clutch when the throttle valve opening is large, the working oil is discharged from the hydraulic servo unit through an orifice having a small cross-sectional area. Thus, the clutch is connected slowly. Accordingly, the clutch is smoothly connected at speeds depending on the throttle valve opening. In the illustrated embodiment, the clutch valve (main clutch) of the hydraulically operated continuously variable transmission is controlled. The principles of the present invention are however not limited to the illustrated arrangement, but may also be applicable to the controlling of a clutch comprising friction plates with a servo unit.

Figure 8:
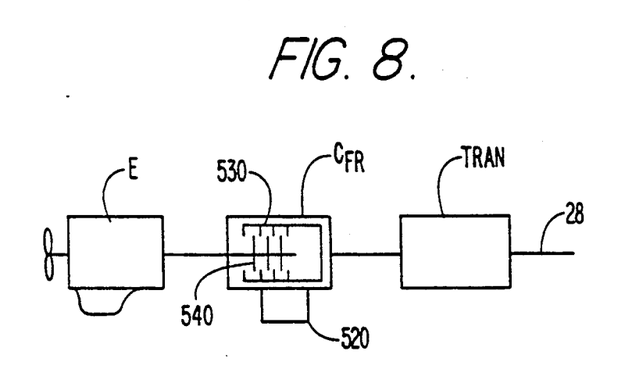
FIG. 8 is a circuit diagram of an engine and transmission arrangement according to one embodiment of the present invention.

Such an arrangement is illustrated in FIG. 8. An engine E is connected to an output shaft 28 through a friction-type clutch $C_{FR}$ and a transmission TRAN. A servo unit 520 is provided for controlling the clutch $C_{FR}$. The clutch $C_{FR}$ has friction plates 530, 540 which are pressable against each other under a force controlled by the servo unit 520.

Although a certain preferred embodiment has been shown and described, it should be understood that may changes and modifications may be made therein without departing from the scope of the appended claims.

I claim:

1. A clutch control device for a transmission having a clutch for controlling the transfer of power through the transmission and a hydraulic servo unit for selectively connecting and disconnecting the clutch, said clutch control device comprising:

a first discharge oil passage for discharging working oil from the hydraulic servo unit when the clutch is connected by the hydraulic servo unit to start the transfer of power;

an orifice disposed in said first discharge oil passage;

a second discharge oil passage for discharging the working oil from said first discharge oil passage, said second discharge oil passage communicating with said first discharge oil passage upstream of said orifice with respect to the direction in which the working oil flows through said first discharge oil passage; and a relief valve disposed in said second discharge oil passage and openable only when the pressure of the working oil in said second discharge passage is higher than the pressure of the working oil which is developed in said first discharge oil passage upstream of said orifice when the working oil is at a normal temperature.

2. A clutch control valve according to claim 1, wherein said relief valve is arranged such that it is closed under an oil pressure developed in said first discharge oil passage when the working oil is at a predetermined higher temperature, and it is opened under an oil pressure developed in said first discharge oil passage when the working oil is at a predetermined lower temperature.

3. A clutch control valve according to claim 1 or 2, wherein said clutch comprises a clutch having friction plates which are pressable against each other under a force controlled by said hydraulic servo unit.

4. A clutch control valve according to claim 1 or 2, wherein said transmission comprises a hydraulically operated continuously variable transmission having a hydraulic pump and a hydraulic motor, at least one of which has a variable displacement, and a closed hydraulic circuit interconnecting said hydraulic pump and said hydraulic motor and including a bypass passage therebetween, said clutch comprising a clutch valve disposed in said bypass passage for controlling the opening of the bypass passage.

5. A clutch control device for a transmission associated with an engine and having a clutch for controlling the transfer of power through the transmission and a hydraulic servo unit for selectively connecting and disconnecting the clutch, said clutch control device comprising:

a discharge oil passage for discharging working oil from the hydraulic servo unit when the clutch is connected by the hydraulic servo unit to start the transfer of power;

an orifice disposed in said discharge oil passage for restricting the flow of the working oil discharged through said discharge oil passage; and orifice changing means for changing the connecting speed of said clutch by modifying the degree to which the flow of the working oil is restricted by said orifice, depending on the magnitude of an indication of a throttle valve opening of the engine.

6. A clutch control device according to claim 5, wherein said orifice comprises a variable orifice whose diameter is variably controlled by said orifice changing means.

7. A clutch control device according to claim 6, wherein the diameter of said variable orifice is controlled so as to be smaller as the throttle valve opening becomes greater.

8. A clutch control device for a transmission associated with an engine and having a clutch for controlling the transfer of power through the transmission and a hydraulic servo unit for selectively connecting and disconnecting the clutch, said clutch control device comprising:

a discharge oil passage for discharging working oil from the hydraulic servo unit when the clutch is connected by the hydraulic servo unit to start the transfer of power;

an orifice disposed in said discharge oil passage for restricting the flow of the working oil discharged through said discharge oil passage; and orifice changing means for changing the connecting speed of said clutch by modifying the degree to which the flow of the working oil is restricted by said orifice, depending on the magnitude of an indication of a throttle valve opening of the engine, wherein said discharge oil passage is branched into first and second branch discharge oil passages, said orifice comprising a first fixed orifice disposed in said first branch discharge oil passage and a second fixed orifice disposed in said second branch discharge oil passage, said orifice changing means comprising an orifice changing valve disposed in said second branch discharge oil passage and connected in series with said second fixed orifice.

9. A clutch control device according to claim 8, wherein said orifice changing valve comprises a shutoff valve selectively openable and closable depending on the throttle valve opening.

10. A clutch control device according to claim 9, wherein said orifice changing valve is closed when the throttle valve opening is larger than a predetermined opening and opened when the throttle valve opening is smaller than said predetermined opening.

11. A clutch control device for a transmission associated with an engine and having a clutch for controlling the transfer of power through the transmission and a hydraulic servo unit for selectively connecting and disconnecting the clutch, said clutch control device comprising:

a discharge oil passage for discharging working oil from the hydraulic servo unit when the clutch is connected by the hydraulic servo unit to start the transfer of power;

an orifice disposed in said discharge oil passage for restricting the flow of the working oil discharged through said discharge oil passage; and orifice changing means for changing the connecting speed of said clutch by modifying the degree to which the flow of the working oil is restricted by said orifice, depending on the magnitude of an indication of a throttle valve opening of the engine, wherein said clutch comprises a clutch having friction plates which are pressable against each other under a force controlled by said hydraulic servo unit.

12. A clutch control device for a transmission associated with an engine and having a clutch for controlling the transfer of power through the transmission and a hydraulic servo unit for selectively connecting and disconnecting the clutch, said clutch control device comprising:

a discharge oil passage for discharging working oil from the hydraulic servo unit when the clutch is connected by the hydraulic servo unit to start the transfer of power;

an orifice disposed in said discharge oil passage for restricting the flow of the working oil discharged through said discharge oil passage; and orifice changing means for changing the connecting speed of said clutch by modifying the degree to which the flow of the working oil is restricted by said orifice, depending on the magnitude of an indication of a throttle valve opening of the engine, wherein said transmission comprises a hydraulically operated continuously variable transmission having a hydraulic pump and a hydraulic motor, at least one of which has a variable displacement, and a closed hydraulic circuit interconnecting said hydraulic pump and said hydraulic motor and including a bypass passage therebetween, said clutch comprising a clutch valve disposed in said bypass passage for controlling the opening of the bypass passage.

* * * * *